US009734239B2

(12) United States Patent
Allen et al.

(10) Patent No.: US 9,734,239 B2
(45) Date of Patent: *Aug. 15, 2017

(54) PROMPTING SUBJECT MATTER EXPERTS FOR ADDITIONAL DETAIL BASED ON HISTORICAL ANSWER RATINGS

(71) Applicant: International Business Machines Corporation, Armonk, NY (US)

(72) Inventors: Corville O. Allen, Morrisville, NC (US); Joshua S. Allen, Durham, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 303 days.

This patent is subject to a terminal disclaimer.

(21) Appl. No.: 14/320,036

(22) Filed: Jun. 30, 2014

(65) Prior Publication Data
US 2015/0379120 A1 Dec. 31, 2015

(51) Int. Cl.
*G06F 17/30* (2006.01)

(52) U.S. Cl.
CPC .... *G06F 17/30684* (2013.01); *G06F 17/3053* (2013.01); *G06F 17/30693* (2013.01); *G06F 17/30696* (2013.01); *G06F 17/30728* (2013.01); *G06F 17/30864* (2013.01); *G06F 17/30867* (2013.01)

(58) Field of Classification Search
CPC .......... G06F 17/30864; G06F 17/3053; G06F 17/30693; G06F 17/30696; G06F 17/30728; G06F 17/30867
USPC ................................................. 707/723, 748
See application file for complete search history.

(56) References Cited

U.S. PATENT DOCUMENTS

| 7,693,705 | B1 | 4/2010 | Jamieson | |
|---|---|---|---|---|
| 8,321,496 | B2 | 11/2012 | Wilson | |
| 2003/0028525 | A1 | 2/2003 | Santos et al. | |
| 2012/0317102 | A1 | 12/2012 | Hu et al. | |
| 2014/0304198 | A1* | 10/2014 | Oral et al. | 706/12 |
| 2015/0012548 | A1* | 1/2015 | Oral et al. | 707/751 |

(Continued)

FOREIGN PATENT DOCUMENTS

| WO | WO2011019852 | 2/2011 |
|---|---|---|
| WO | WO2013130894 | 9/2013 |

OTHER PUBLICATIONS

Wigert et al., Collaboration in virtual word: The Role of the Facilitator, 2012, IEEE, 973-982.*

(Continued)

*Primary Examiner* — Jean B Fleurantin
(74) *Attorney, Agent, or Firm* — VanLeeuwen & VanLeeuwen; Diana R. Gerhardt

(57) ABSTRACT

An approach is provided for evaluating a potential post based on historical data. In the approach, historically highly rated attributes that to previously received highly rated posts are identified. The process receives a potential post from an online Subject Matter Expert (SME). The process analyzes the potential post, using a Natural Language Processing (NLP) routine performed by computer processors. The analysis identifies a lack of one or more of the historically highly rated attributes in the potential post. The process then notifies the SME, based on the analysis, regarding the lack of one or more of the historically highly rated attributes in the potential post.

13 Claims, 7 Drawing Sheets

(56) References Cited

U.S. PATENT DOCUMENTS

2015/0169395 A1\* 6/2015 Giffels et al. .................. 714/47
2015/0356203 A1\* 12/2015 Allen et al. .................. 707/725

OTHER PUBLICATIONS

Anonymous, "Topic Knowledge Rating," ip.com, IPCOMM000208295D, Jun. 29, 2011, 3 pages.
Allen et al., "Prompting Subject Matter Experts for Additional Detail Based on Historical Answer Ratings," U.S. Appl. No. 15/064,505, filed Mar. 8, 2016, 33 pages.
"List of IBM Patents or Patent Applications Treated as Related," Letter from Leslie A. Van Leeuwen, Mar. 8, 2016, 1 page.
Wigert et al., Collaboration in Virtual Worlds: The Role of the Facilitator, 2012, IEEE, pp. 913-982.

\* cited by examiner

PROMPTING SUBJECT MATTER EXPERTS FOR ADDITIONAL DETAIL BASED ON HISTORICAL ANSWER RATINGS

BACKGROUND OF THE INVENTION

In many online systems, users may submit product reviews, answer questions, or otherwise provide their opinion. For example, an online retail store may allow users to review products. These reviews provide information to consumers in order to judge the quality of a product before purchase. In another example, some online sites allow a community of experts (e.g., Subject Matter Experts, or "SMEs," etc.) to answer questions, and each answer is ranked and rated by the community. In response, the community ranks the user's post in terms of quality, accuracy, or overall helpfulness. In this manner, user posts may establish credibility and be regarded as "high quality." Posts that are not ranked as "helpful" by the community are often driven out of sight or ranked at the bottom of the page, while posts that are considered to be helpful are usually prominently displayed as a credible, or helpful, answer or review. In another context, a Question/Answer (QA) system is used to answer user questions posed in a natural language format. One aspect in a QA system is by using screened SMEs. In a QA system environment, the SMEs are people that evaluate information and identify whether it provides supporting evidence for the answer in the QA system. The SME's feedback is used to produce an answer key and, hopefully, better results from the QA system. This takes time, effort, and investment in the SMEs. A challenge faced by SMEs is that the SME often does not know beforehand what the community will regard as a thorough and helpful post or review. If the SME is unable to effectively communicate a response to a product or question, the SME's response will not be well received by the community regardless of the SME's experience and qualifications.

BRIEF SUMMARY OF THE INVENTION

An approach is provided for evaluating a potential post based on historical data. In the approach, historically highly rated attributes that to previously received highly rated posts are identified. The process receives a potential post from an online Subject Matter Expert (SME). The process analyzes the potential post, using a Natural Language Processing (NLP) routine performed by computer processors. The analysis identifies a lack of one or more of the historically highly rated attributes in the potential post. The process then notifies the SME, based on the analysis, regarding the lack of one or more of the historically highly rated attributes in the potential post.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION OF THE INVENTION

Figure 1:
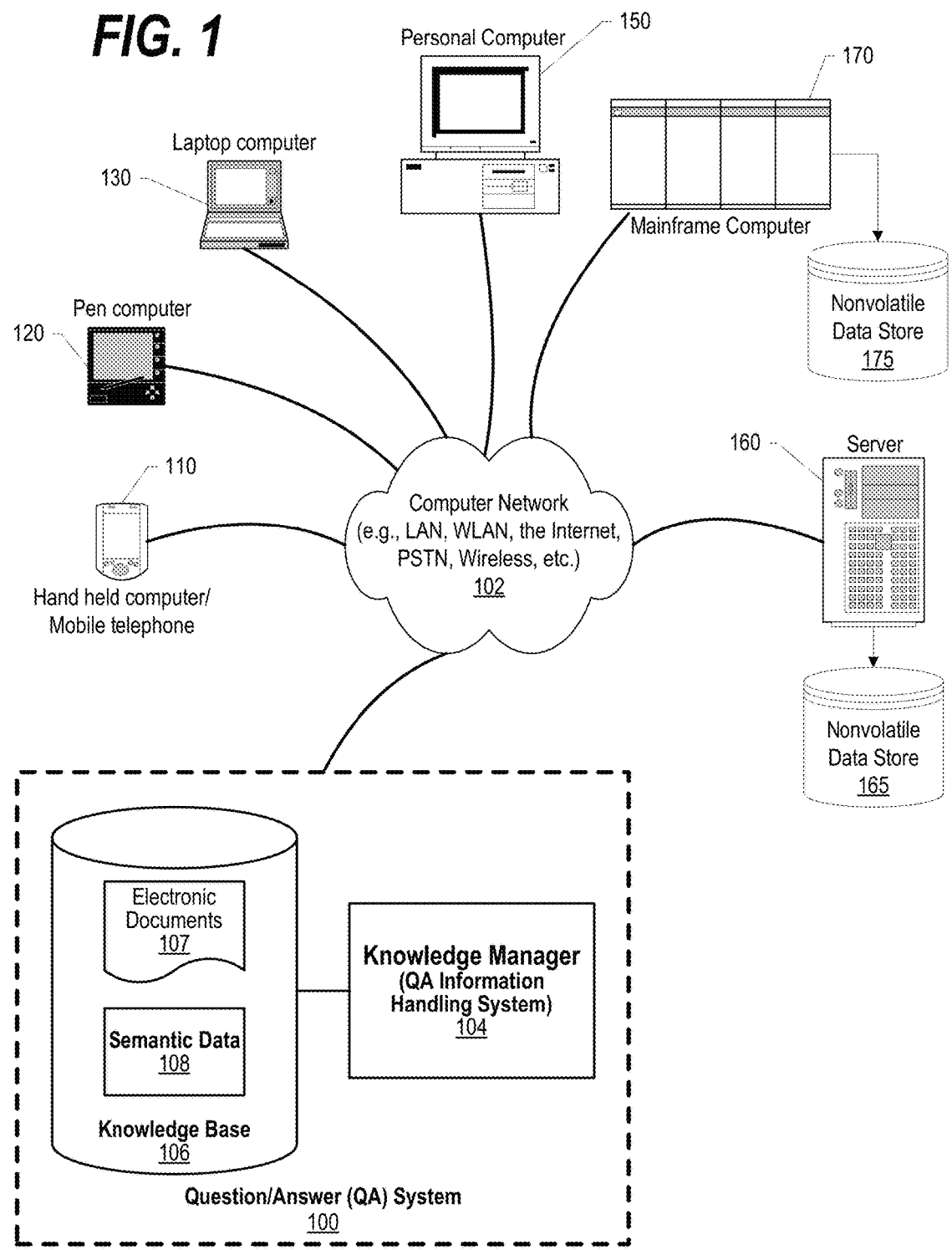
FIG. 1 depicts a network environment that includes a knowledge manager that utilizes a knowledge base.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
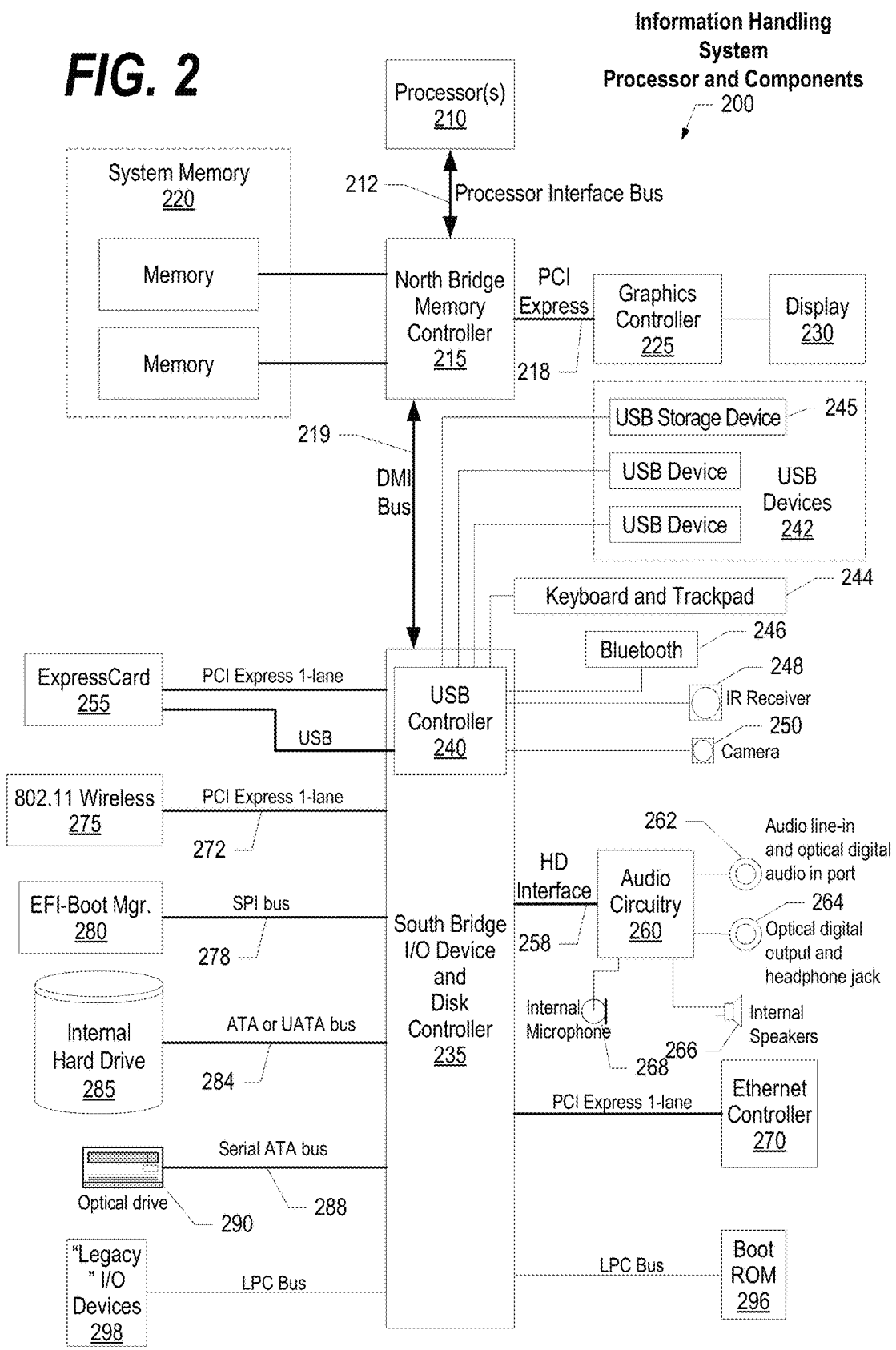
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-7 depict an approach that can be executed on an information handling system, to provide qualitative post analyses to Subject Matter Experts (SMEs) in a Question/Answer (QA) system, such as QA System 100 shown in FIG. 1. The approach evaluates SME posts for key attributes that have historically signified high quality posts. When the post is lacking these key attributes, the system may solicit (prompt) additional information from the SME to achieve a higher quality by the community's standards. These "key attributes" have been determined from previous posts by SMEs to be attributes that the community of end users has rated highly.

In one embodiment, SME's post messages to an online service (an online retailer, question & answer forum, etc.). The community of end users rates SME responses based on helpfulness and quality. Based on these ratings, future SME posts are pre-evaluated for helpfulness and quality by detecting missing attributes. Further, the system prompts information from the SME to fill in missing attributes that historically signify high quality posts.

The system analyzes the answer text being given by an SME for a specific question and answer type, it picks out key terms and attributes in the answer. The system picks out key terms by their frequency for the Lexical Answer Type (LAT), context, domain and goal/action based on historical answer data. The process rates key terms by their frequency in the post and based on the term type, with a higher rating likely to influence quality answers. The process identifies historical answers for questions seeking the same type of action or context that were rated high. The process also analyzes the current answer text terms and attributes against the historical data. The process flags each missing historical attribute or missing term for further input. For each missing attribute or term found, the process finds the statement in a previously submitted quality answer and finds the key noun or subject of the statement. The process reuses the subject or noun in the statement as a seed for additional information. The process prompts the SME for additional information related to the missing attributes and gives a clue with the historical statement. For example, if a missing attribute related to installation instructions, the prompt might include the statement "To install you will need administrative permissions." The prompt might include a statement such as "Install— Better answers usually have information about installation. For example, 'To install you need administrative permissions.'" Based on the prompt, the SME chooses to add more statements in the prompt and the answer text is re-analyzed with an indication that the missing attribute has now been satisfied.

Figure 3:
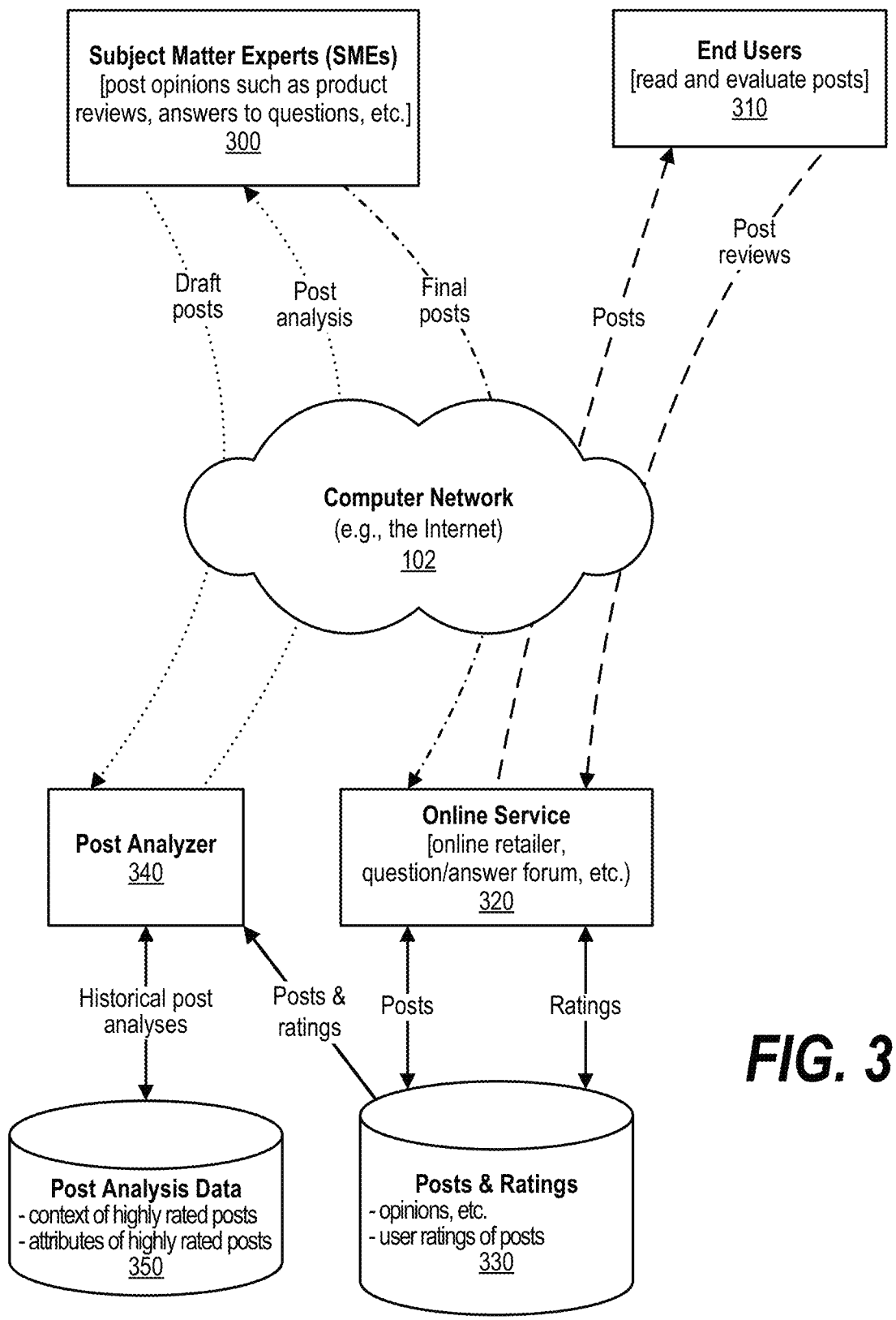
FIG. 3 is a component diagram depicting the various components in prompting Subject Matter Experts (SMEs) for additional detail based on historical answer ratings.

FIG. 3 is a component diagram depicting the various components in prompting Subject Matter Experts (SMEs) for additional detail based on historical answer ratings. SMEs 300 provide opinions, answers, evaluations, and the like to online service 320 for viewing by the online service's end users 310. Post analyzer 340 is a process that can be embedded in the online service post submission process, or a process external to the online service. As the name implies, post analyzer 340 is a process that analyzes posts Given the wide variety of online services that might utilize post analyzer 340, SMEs 300 may provide posts regarding many different topics, such as product reviews pertaining to a retail store online service, answers to questions pertaining to Question/Answer (QA) sites, such as sites that offer advice on any variety of subjects as well as general or specific QA systems, such as QA system 100 shown in FIG. 1. SMEs prepare draft posts. These draft posts are potential posts as they are analyzed by post analyzer 340 rather than added to the pool of posts at the online service that are viewable by end users 310.

Post analyzer 340 analyzes the potential post to identify any quality attributes missing from the potential post using post analysis data that is retrieved from data store 350. The post analyzer returns the analysis to the SME that submitted the potential post. The analysis might be a notice that includes the analysis details (e.g., missing attributes, etc.) and might further provide a prompt for the SME to use to provide missing attribute data. The SME can continue to submit revised potential posts that are reanalyzed by post analyzer with the goal of reducing or eliminating the missing attributes from the potential post. In one embodiment, post analyzer 340 further provides a quality analysis on attributes found in the potential post. For example, the potential post might have included brief installation details, but the post analyzer identifies that high quality posts received at the online service had more extensive installation details. This shortcoming regarding an attribute found in the potential post is also returned to the SME in the post analysis.

When SME 300 is satisfied with the potential post, based on the post analysis received from post analyzer 340, the SME submits the potential post as a final post that is received by online service 320 and included in data store 330 which is a pool of posts visible to end users 310. End users 310 view posts, evaluate posts, and provide post evaluations regarding the quality of the post. End user evaluation data is also stored in data store 330. The post evaluations can be based on the helpfulness, thoroughness, and correctness of the post. Various types of evaluations can be utilized, such as a simple "thumbs up" and "thumbs down" evaluation that indicates whether the post was a high quality post. Other types of evaluations could include a number/star scale (e.g., ranging from a '5' for a very high quality post to a '1' for a very low quality post, etc.). The system uses these end user evaluations to calculate a composite rating (e.g., an average evaluation score, etc.).

In one embodiment, quality attributes are culled from high quality posts with the high quality posts being posts with composite ratings that meet or exceed a given threshold. For example, in a 5-star rating system, high quality posts might be identified as those posts with a composite rating of 3.5 or higher. Prior to analyzing the potential post from the SME, post analyzer 340 or another process is used to analyze the previously received highly rated posts at the online service (data store 330) with the analysis identifying historically highly rated attributes that are stored in data store 350. Once these historically highly rated attributes are identified, they can be used by post analyzer 340 to analyze the potential posts received from SMEs 300.

Figure 4:
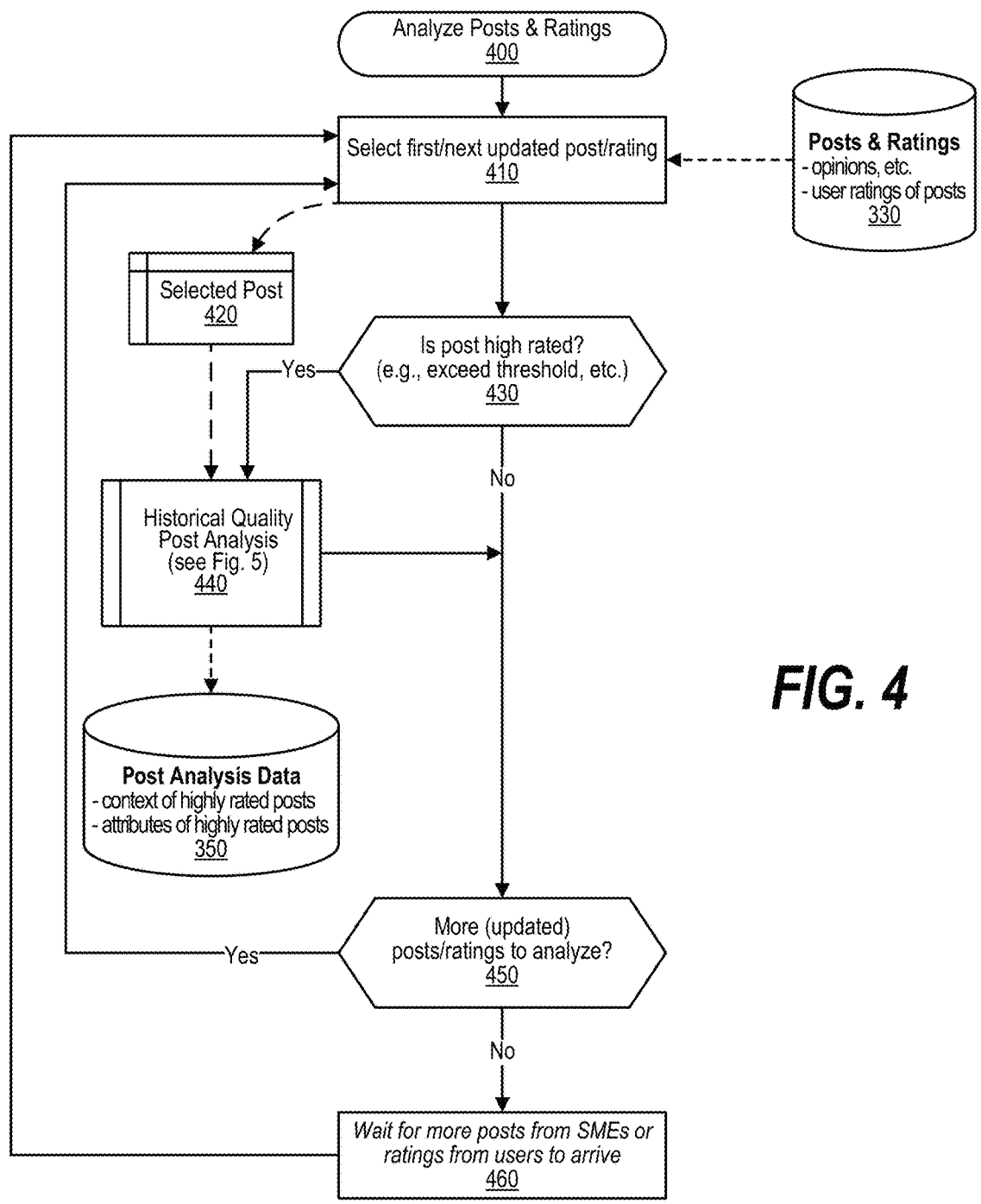
FIG. 4 is a depiction of a flowchart showing the logic used in analyzing posts and ratings.

FIG. 4 is a depiction of a flowchart showing the logic used in analyzing posts and ratings. The process shown in FIG. 4 is used to identify the set of previously received highly rated posts from the larger pool of previously received posts. In addition, the process calls a routine that identifies the historically highly rated attributes from the set of previously received highly rated posts.

Processing commences at 400 whereupon, at step 410, the process selects the first post from data store 330 with data store 330 being the set of previously received posts and their respective cumulative ratings. In one embodiment, the cumulative ratings are separately calculated and provided to end users so that end users can easily identify highly rated posts. The selected post is stored in memory area 420.

The process determines if the selected post is a high quality post (decision 430). In one embodiment, the process makes this determination by comparing the composite rating of the selected post to a predetermined threshold. If the selected post is a highly rated post, then decision 430 branches to the "yes" branch whereupon, at predefined process 440, the process performs a historical quality post analysis on the selected post (see FIG. 5 and corresponding text for further processing details). The results of the historical quality post analysis are stored in data store 350. Post analysis data stored in data store 350 includes context data of highly rated posts as well as attributes found to be present in highly rated posts.

Returning to decision 430, if the selected post is not found to be highly rated, then decision 430 branches to the "no" branch bypassing predefined process 440. The process determines as to whether there are more updated posts in data store 330 to analyze (decision 450). In one embodiment, a newer post might not have a high enough composite rating because it has not received enough evaluations from end users. However, over time the composite rating of the post might increase due to additional evaluations being received from end users. If there are more posts in data store 330 to analyze, then decision 450 branches to the "yes" branch which loops back to select and process the next post as described above. This looping continues until there are no more posts to analyze, at which point decision 450 branches to the "no" branch. At step 460, the process waits for more posts to arrive from SMEs and/or more ratings to arrive from end users regarding existing posts. When additional posts/ratings arrive, processing loops back to step 410 to analyze the new posts and/or posts with updated composite ratings.

Figure 5:
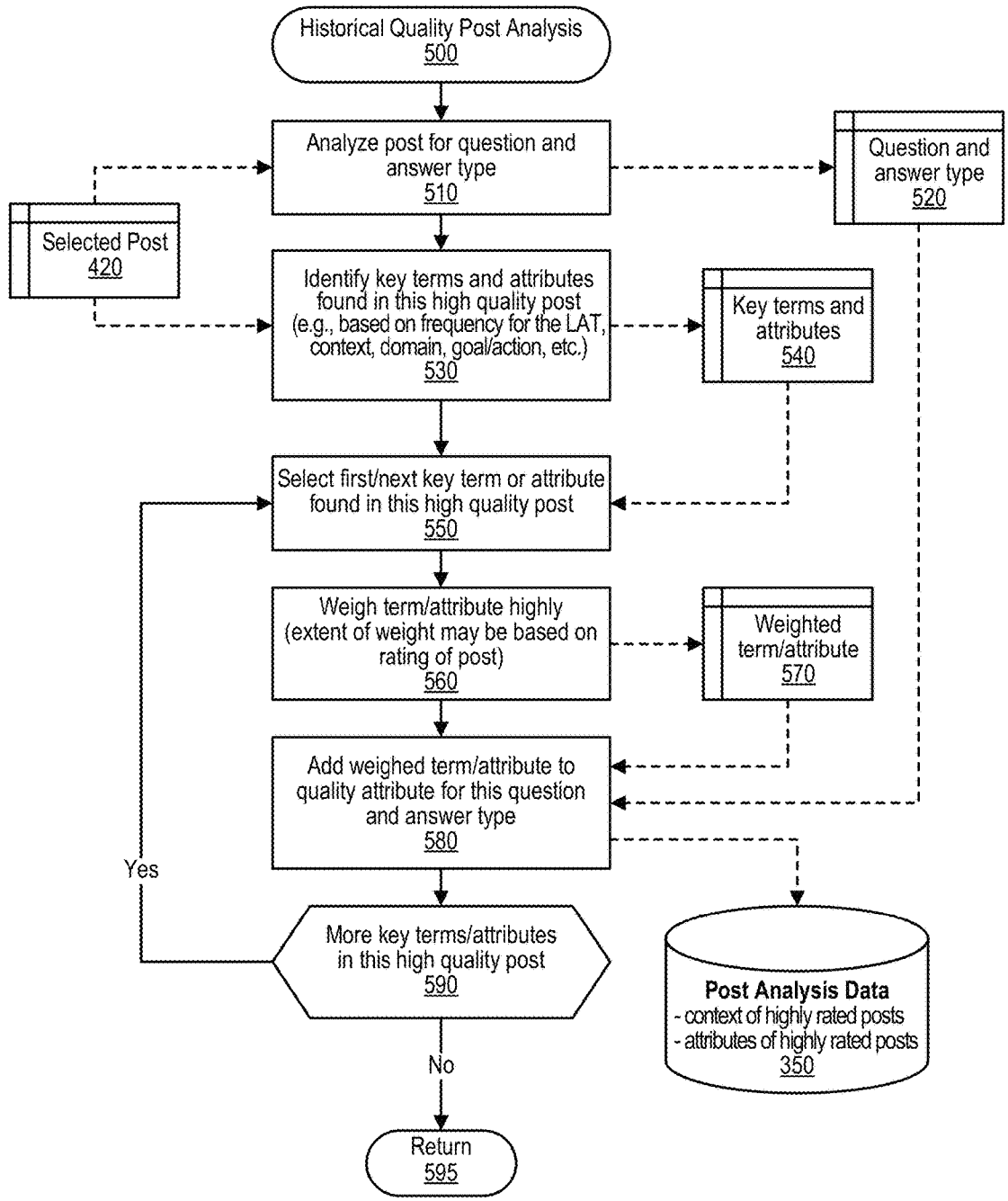
FIG. 5 is a depiction of a flowchart showing the logic performed in a historical quality post analysis.

FIG. 5 is a depiction of a flowchart showing the logic performed in a historical quality post analysis. The processing shown in FIG. 5 is performed when a high quality post (selected post 420) is identified using the process shown in FIG. 4. FIG. 5 processing commences at 500 whereupon, at step 510, the process analyzes the selected (high quality) post for the question and answer type. A Natural Language Processing (NLP) routine is used to identify the question and answer type. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "what is tallest mountain in North America?" and return a responsive answer. Other NLP routines might also be used to generate a human-oriented response, such as responding with "Mt. McKinley is the tallest mountain in North America," rather than simply responding "Mt. McKinley." The process stores the question and answer type in memory area 520. At step 530, the NLP routine identifies key terms and attributes (collectively, "historically highly rated attributes") found in the selected post. The routine identifies the historically highly rated attributes based on the Lexical Answer Type (LAT), the context, the domain of the post, the goal and/or action of the post, and other factors. The process stores the historically highly rated attributes in memory area 540.

At step 550, the process selects the first historically highly rated attribute from memory area 540. At step 560, the process weighs the selected historically highly rated attribute. The weight may be based on the frequency that the historically highly rated attribute is found for the identified question and answer type. For example, if a very large percentage of high quality posts include an "installation" attribute, than the installation attribute would be weighted higher than another quality attribute (e.g., licensing attribute, etc.) that was not found as frequently in high quality posts. The extent of the weight applied may be based on the composite rating of the post so that posts with higher composite ratings have a greater extent of weight applied.

The process stores the weighted historically highly rated attribute in memory area 570. At step 580, the process adds the weighted historically highly rated attribute to the quality attribute for this type of question and answer type. The historically highly rated attribute is stored in data store 350 along with the context of the selected (highly rated) post. If the historically highly rated attribute is already included in data store 350, then the process updates data store 350 by increasing the weight of the historically highly rated attribute based on the weighted attribute data stored in memory area 570. In addition, quality data pertaining to the historically highly rated attribute can also be identified at step 580. The quality data may include the length or extent of discussion pertaining to the historically highly rated attribute. In this manner, in a software field, the process might identify that posts with extensive installation discussion are rated highly, while those with brief installation discussions are not rated as highly.

The process determines as to whether there are additional historically highly rated attributes in the selected (high quality) post (decision 590). If there are additional attributes to process, then decision 590 branches to the "yes" branch whereupon the process loops back to select and process the next attribute as described above. This looping continues until all of the attributes have been processed, at which point decision 590 branches to the "no" branch and processing returns to the calling routine (see FIG. 4) at 595.

Figure 6:
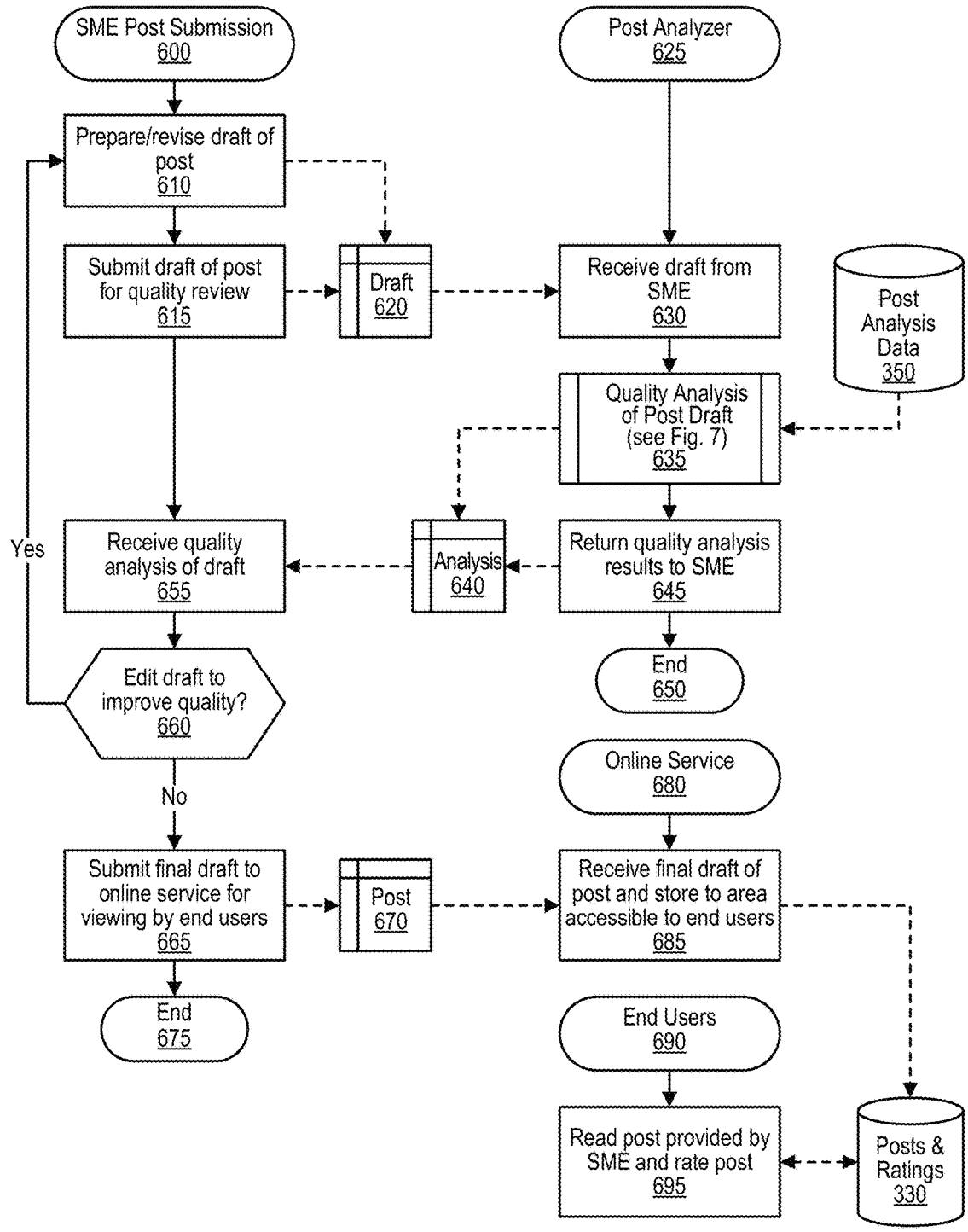
FIG. 6 is a depiction of flowcharts showing the logic used in handling Subject Matter Experts (SMEs) post submissions, providing a post analysis and feedback to the SME, online service reception of the final post, and end user evaluation of posts.

FIG. 6 is a depiction of flowcharts showing the logic used in handling Subject Matter Experts (SMEs) post submissions, providing a post analysis and feedback to the SME, online service reception of the final post, and end user evaluation of posts. SME processing is shown commencing at 600 whereupon, at step 610, the SME prepares a potential post that is stored in memory area 620. At step 615, the SME submits the potential post to the post analyzer for quality analysis.

Post analyzer processing is shown commencing at 625 whereupon, at step 630, the post analyzer receives the potential post from the SME. At predefined process 635, the post analyzer performs a quality analysis of the potential post by utilizing the post analysis data (data store 350) that was previously gathered from historical posts (see FIG. 7 and corresponding text for further processing details). The post analyzer stores the potential post analysis in memory area 640. At step 645, the post analyzer returns the quality analysis results to the SME. Post analyzer processing thereafter ends at 650.

Returning to SME processing, at step 655, the SME receives the quality analysis of the potential post from the post analyzer. The SME evaluates the quality analysis and decides whether to edit the potential post to improve its quality based on the received quality analysis (decision 660). If the SME decides to edit the potential post, then decision 660 branches to the "yes" branch which loops back to have the SME edit the potential post and resubmit the edited post to the post analyzer for further analysis. This looping continues until the SME is satisfied with the quality of the potential post based on the analysis received by the SME from the post analyzer. When the SME is satisfied with the quality of the potential post, decision 660 branches to the "no" branch whereupon, at step 665, the SME submits the final draft of the post (post 670) to the online service so that it can be viewed by the online service's end users. SME processing thereafter ends at 675.

Online service processing commences at 680 whereupon, at step 685, the online service receives the final draft of the post from the SME and adds the post to data store 330 where it is visible to end users. End user processing is shown commencing at 690 whereupon, at step 695, the end users view the newly submitted post that was stored in data store 330. End users can then rate (evaluate) the post with the evaluation data also being stored in data store 330.

Figure 7:
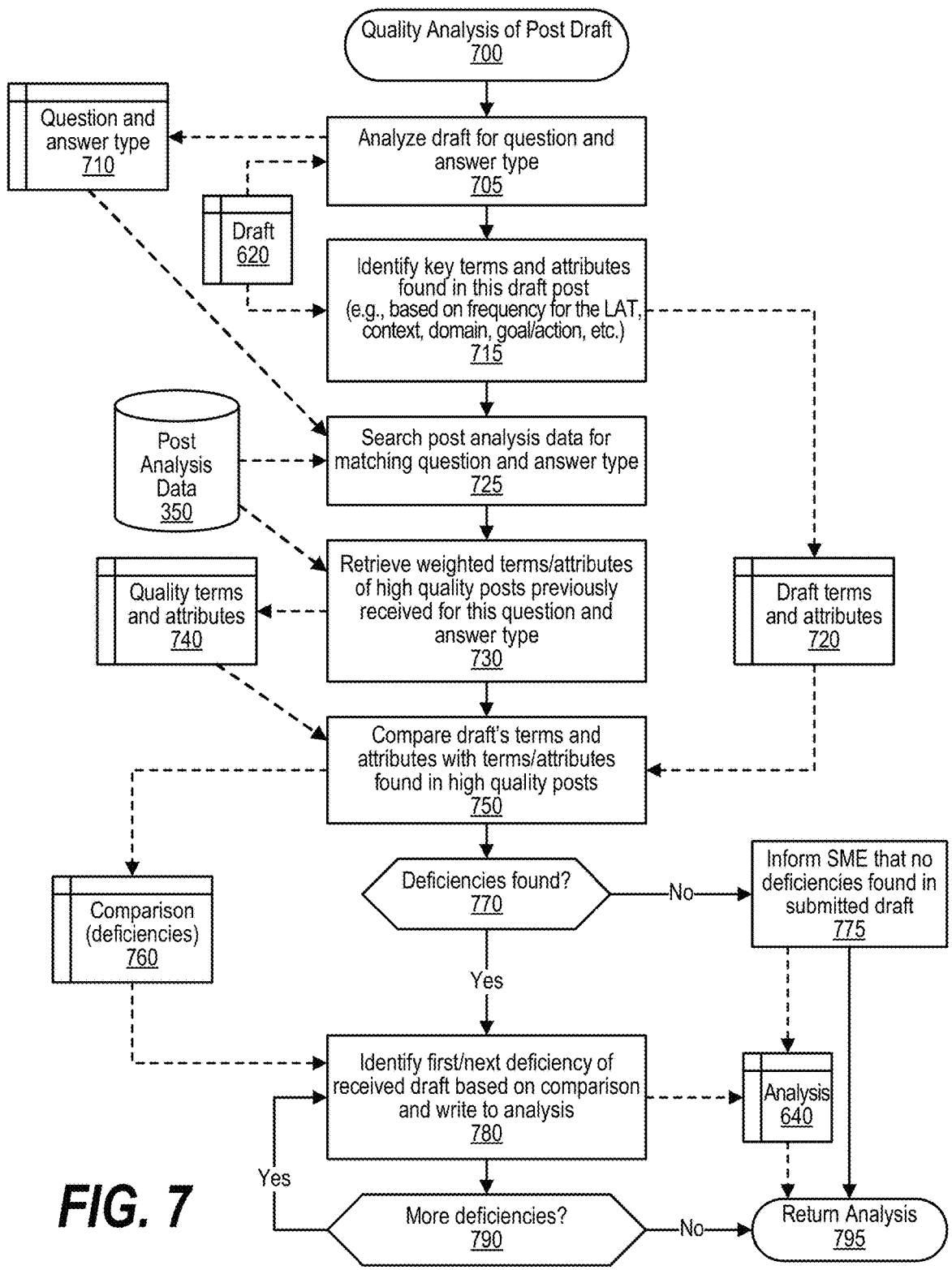
FIG. 7 is a depiction of a flowchart showing the logic performed in a quality analysis of a post draft received from the SME.

FIG. 7 is a depiction of a flowchart showing the logic performed in a quality analysis of a post draft received from the SME. Processing commences at 700 whereupon, at step 705, the process analyzes the potential post from memory area 620 and using a Natural Language Processing (NLP) routine identifies a question and answer type pertaining to the potential post. The process stores the question and answer type pertaining to the potential post in memory area 710. At step 715, the process uses NLP techniques to identify potential post attributes that are found to be included in the potential post. The attributes can be based on the Lexical Answer Type (LAT), the context, the domain of the post, the goal and/or action of the post, and other factors. In one embodiment, the NLP techniques used to identify the potential post attributes are the same techniques used to identify the historically highly rated attributes (see step 530 in FIG. 5). The process stores the potential post attributes in memory area 720.

At step 725, the process searches post analysis data from data store 350 for data with question and answer types matching the potential post's question and answer type. At step 730, the process retrieves the weighted historically highly rated attributes found to be in highly rated posts that were previously received for this question and answer type. The weighted historically highly rated attributes are retrieved from data store 350 and stored in memory area 740.

At step 750, the process compares the potential post attributes found in the potential post with the identified historically highly rated attributes found in step 730. The process stores historically highly rated attributes that were not found in the potential post in memory area 760 as deficiencies that might be addressed by the SME to improve the post's quality. In one embodiment, the process further provides a quality analysis on attributes found in the potential post. For example, the potential post might have included brief installation details, but the post analyzer identifies that high quality posts received at the online service had more extensive installation details. This shortcoming regarding an attribute found in the potential post is stored in memory area 760 and is also returned to the SME in the post analysis.

After analysis of the potential post, the process determines as to whether any deficiencies were found in the potential post (decision 770). If no deficiencies were identified, then decision 770 branches to the "no" branch whereupon, at step 775, the process informs the SME that no deficiencies were found in the potential post. Processing thereafter returns to the calling routine (see FIG. 6) at 795.

On the other hand, if deficiencies were found in the potential post, then decision 770 branches to the "yes" branch whereupon, at step 780, the first deficiency of the potential post is retrieved and written to the analysis (memory area 640). For each missing attribute or term found, the process finds the statement in a previously submitted quality answer and finds the key noun or subject of the statement. The process reuses the subject or noun in the statement as a seed for additional information. The process prompts the SME for additional information related to the missing attributes and gives a clue with the historical statement. For example, if a missing attribute related to installation instructions, the prompt might include the statement "To install you will need administrative permissions." The prompt might include a statement such as "Install—

Better answers usually have information about installation. For example, 'To install you need administrative permissions.'" Based on the prompt, the SME chooses to add more statements in the prompt and the answer text is re-analyzed with an indication that the missing attribute has now been satisfied. In addition, in the case of a shortcoming where the attribute is found in the potential post but the attribute data provided by the SME is deficient (e.g., lacking detail, too brief, etc.), the information regarding the shortcoming is written to the analysis (memory area 640). The process determines as to whether there are more deficiencies that were found (decision 790). If there are more deficiencies to process, then decision 790 branches to the "yes" branch which loops back to step 780 to identify the next deficiency and write information regarding the deficiency to analysis memory area 640 as described above. This looping continues until there are no more deficiencies to process, at which point decision 790 branches to the "no" branch and processing returns to the calling routine (see FIG. 6) at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory coupled to at least one of the processors;
   a network adapter that connects the information handling system to a computer network; and
   a set of instructions stored in the memory and executed by at least one of the processors to evaluating a potential post based on historical data, wherein the set of instructions perform actions of:
      identifying a plurality of historically highly rated attributes corresponding to a plurality of previously received highly rated posts, wherein the identifying further comprises selecting the plurality of previously received highly rated posts from a larger plurality of previously received posts;
      receiving, via a computer network, the potential post from an online Subject Matter Expert (SME);
      analyzing the potential post, using a Natural Language Processing (NLP) routine performed by the processor, wherein the analysis identifies a lack of one or more of the historically highly rated attributes in the potential post;
      notifying, based on the analysis, the SME regarding the lack of one or more of the historically highly rated attributes in the potential post;
      receiving, in response to the notifying, one or more revised potential posts from the SME; and
      including at least one of the one or more revised potential posts in the larger plurality of previously received posts based on an indication received from the SME, wherein the included revised potential post is visible to the end users for evaluation.

2. The information handling system of claim 1 wherein the selecting actions further comprise:
   comparing a composite rating corresponding to each of the larger plurality of previously received posts to a threshold; and
   identifying the plurality of previously received highly rated posts based on the comparison, wherein the identified plurality of previously received highly rated posts have composite ratings that at least meet the threshold.

3. The information handling system of claim 2 wherein the actions further comprise:
   performing a NLP analysis on the plurality of previously received highly rated posts, wherein the analysis results in the plurality of historically highly rated attributes.

4. The information handling system of claim 3 wherein the actions further comprise:
   performing the NLP analysis on the potential post, wherein the analysis results in a plurality of potential post attributes;
   comparing the historically highly rated attributes to the potential post attributes; and
   identifying the lack of one or more of the historically highly rated attributes in the potential post based on the comparison.

5. The information handling system of claim 4 wherein the actions further comprise:
   performing a quality analysis using a qualitative NLP process, wherein the quality analysis is performed on a set of one or more attributes found in the potential post, and wherein the quality analysis identifies one or more shortcomings of the found attributes; and
   wherein the notifying further includes notifying the SME regarding the shortcomings identified in the found attributes.

6. The information handling system of claim 2 wherein the composite ratings are based on one or more evaluations received from one or more end users regarding each of the larger plurality of previously received posts.

7. The information handling system of claim 6 wherein the notifying further comprises:
   prompting the SME to provide the one or more historically highly rated attributes lacking in the potential post.

8. A computer program product stored in a non-transitory computer readable storage medium, comprising computer instructions that, when executed by an information handling system, causes the information handling system to evaluating a potential post based on historical data by performing actions comprising:
   identifying a plurality of historically highly rated attributes corresponding to a plurality of previously received highly rated posts, wherein the identifying further comprises selecting the plurality of previously received highly rated posts from a larger plurality of previously received posts;

receiving the potential post from an online Subject Matter Expert (SME);

analyzing the potential post, using a Natural Language Processing (NLP) routine performed by the processor, wherein the analysis identifies a lack of one or more of the historically highly rated attributes in the potential post;

notifying, based on the analysis, the SME regarding the lack of one or more of the historically highly rated attributes in the potential post;

receiving, in response to the notifying, one or more revised potential posts from the SME; and including at least one of the one or more revised potential posts in the larger plurality of previously received posts based on an indication received from the SME, wherein the included revised potential post is visible to the end users for evaluation.

9. The computer program product of claim 8 wherein the selecting actions further comprise:

comparing a composite rating corresponding to each of the larger plurality of previously received posts to a threshold; and identifying the plurality of previously received highly rated posts based on the comparison, wherein the identified plurality of previously received highly rated posts have composite ratings that at least meet the threshold.

10. The computer program product of claim 9 wherein the actions further comprise:

performing a NLP analysis on the plurality of previously received highly rated posts, wherein the analysis results in the plurality of historically highly rated attributes.

11. The computer program product of claim 10 wherein the actions further comprise:

performing the NLP analysis on the potential post, wherein the analysis results in a plurality of potential post attributes;

comparing the historically highly rated attributes to the potential post attributes; and identifying the lack of one or more of the historically highly rated attributes in the potential post based on the comparison.

12. The computer program product of claim 11 wherein the actions further comprise:

performing a quality analysis using a qualitative NLP process, wherein the quality analysis is performed on a set of one or more attributes found in the potential post, and wherein the quality analysis identifies one or more shortcomings of the found attributes; and wherein the notifying further includes notifying the SME regarding the shortcomings identified in the found attributes.

13. The computer program product of claim 9 wherein the composite ratings are based on one or more evaluations received from one or more end users regarding each of the larger plurality of previously received posts, and wherein the notifying further comprises:

prompting the SME to provide the one or more historically highly rated attributes lacking in the potential post.

* * * * *